(No Model.)
J. H. BURROWS.
COFFEE POT.
No. 539,165. Patented May 14, 1895.
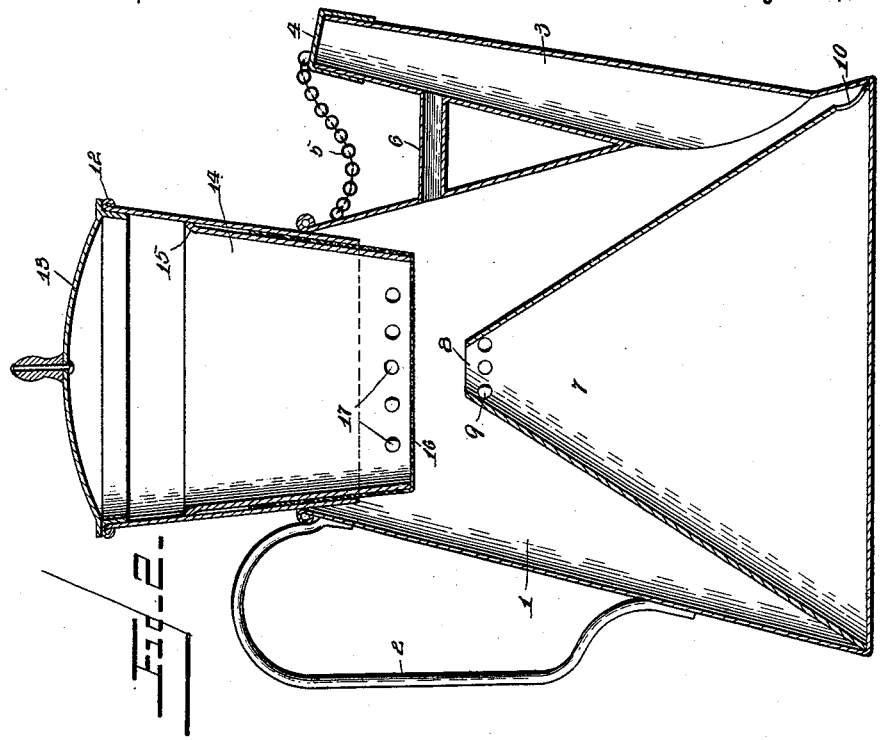
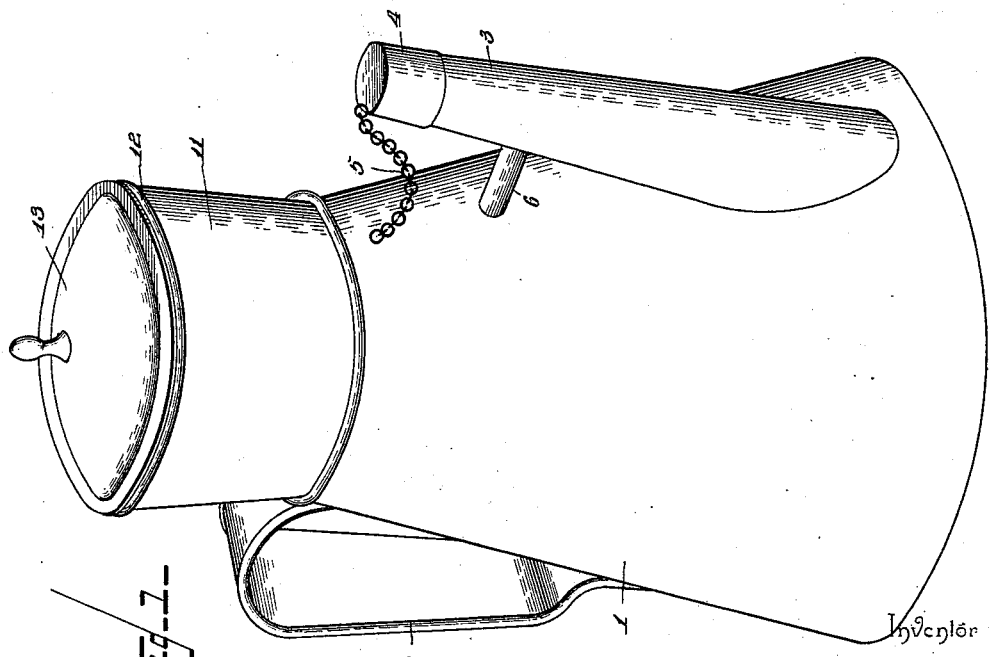
Witnesses
Thos W Riley
J. B. ―――
Inventor
John H. Burrows,
By his Attorneys.
C A Snow & Co.
THE NORRIS PETERS CO., PHOTO-LITHO., WASHINGTON, D. C.

UNITED STATES PATENT OFFICE.

JOHN H. BURROWS, OF RICH HILL, MISSOURI, ASSIGNOR OF ONE-HALF TO J. W. JAMISON, OF SAME PLACE.

COFFEE-POT.

SPECIFICATION forming part of Letters Patent No. 539,165, dated May 14, 1895.

Application filed December 20, 1894. Serial No. 532,427. (No model.)

*To all whom it may concern:*

Be it known that I, JOHN H. BURROWS, a citizen of the United States, residing at Rich Hill, in the county of Bates and State of Missouri, have invented a new and useful Coffee-Pot, of which the following is a specification.

The objects of this invention are to improve the circulation of water in coffee pots, and to insure the complete passage of the steam and boiling water through the grounds which are usually contained in a separate receptacle provided therefor. These ends have been sought heretofore, and it has been suggested to provide the coffee pot with a conical dome located at its bottom and projecting up into the interior thereof, and whereby the water and steam are made to circulate down to the base of the dome and thence up through the center thereof, and into the grounds receptacle.

My invention comprises these broad principles and the novelty of my invention resides in certain peculiar features of construction whereby this class of coffee pots is improved, and whereby the complete brewing of the coffee is insured.

In the drawings, Figure 1 represents a perspective view of a coffee-pot constructed after the manner of my invention. Fig. 2 is an enlarged vertical section thereof.

The reference numeral 1 indicates the body of the coffee pot, which is frusto-conical in form, as is usual in such cases, and which is provided with a handle 2, whereby it may be manipulated.

3 indicates a spout which projects upwardly and outwardly from the lower portion of the body 1. The upper end of the spout 3 terminates a short distance below the upper end of the body 1, and is there provided with a cap 4 whereby it may be closed. The cap 4 is removably arranged on the spout 3, and is provided with a chain 5 which operates to connect it to the body 1, and to prevent its loss when displaced from the spout 3.

Communicating with the upper portion of the spout 3, and with the corresponding portion of the body 1, is the horizontal branch pipe 6, which serves to permit the passage of the water and steam from the spout 3 into the upper portion of the body, as will be explained hereinafter.

7 indicates a conical dome, which is located within the body 1 and which is of a size at its base equal to the greatest diameter of said body. The upper end of the dome 7 is formed as a point, and is provided thereat with an enlarged opening 8. Around this opening 8 the smaller openings 9 are formed, all serving the same purpose, which is to permit the exit of the water and steam from the interior of the dome.

10 indicates an inlet opening which is formed at the base of the dome 1, and adjacent to the inner end of the spout 3. This opening serves to permit the entry of the water into the interior of the dome, while the openings 8 and 9 make its expulsion therefrom possible.

11 indicates an enlarged and tapering tube, which has its upper end formed with a bead 12, and which has its lower end fitted within the upper end or mouth of the body 1. Owing to the taper in the tube 11 the same will bind in the mouth or upper end of the body 1, and be thereby secured in place.

13 indicates a top for the coffee pot which fits over the upper end of the tube 11, and which closes the same and therefore the body 1.

Located within the tube 11 is a supplemental tube 14, which has its upper end formed with an outwardly-extending annular flange 15, calculated to bind against the interior sides of the tube 11, and by these means to hold itself from excessive downward movement in the tube 11. The size and shape of the tube 14 are such that the lower end of said tube will project a slight distance below the corresponding end of the tube 11; and the tubes 11 and 14 have arranged between them and closing the lower end of the tube 14 a cloth strainer 16, which divides the interior of the tube 14 from the body portion 1 and which forms a receptacle for the coffee. The lower end of the tube 14 is formed with a series of openings 17 therein, through which the water is capable of circulating, and which are provided to assist in the complete circulation of the same.

In the use of my invention the parts composing the same are placed in the positions shown in the drawings, whereupon the tube 14 is filled with the grounds and water poured into the body 1. The coffee pot is now subjected to heat, as is usual, whereupon the same will cause the water in the center of the body, or rather within the dome 7, to rise. The water so influenced will find exit from the dome 7 through the medium of the openings 8 and 9. From this point the water will rise through the strainer 16 and openings 17, and into direct association with the coffee grounds of the tube 14. On account of the conical form of the dome 7 and the arrangement of the strainer and coffee grounds immediately above the opening in the apex of said dome, the boiling water being condensed as it passes upward toward the apex of the dome is, together with the steam, projected through the aperture 8 in the form of a vertical jet, which passes upward and penetrates the superposed strainer and the grounds therein. By reason of the particular arrangement of the branch pipe 6 in a horizontal plane between the aperture 8 in the top of the dome 7, and the lower end of the strainer, the hot water and steam passing upward through the spout 3 and confined by the cap 4, are projected in the form of a horizontal jet beneath the strainer where they mingle with the upward jet from the dome 7 and are also carried through the strainer and grounds. This will subject the coffee grounds to the most thorough boiling, and after the water has found its way into the tube 14 it will pass therefrom, principally through the openings 17, and down the space directly adjacent to the interior sides of the body 1, until the lower extremity thereof is reached, whereupon it will proceed through the opening 10, and into the dome 7, as has been explained. The boiling water within the body portion 1 will also cause a slight circulation through the spout 5, and to overcome the tendency which this circulation would have, the branch tube 6 is provided. Thus the branch tube 6 forms an exit for the water at the upper end of the spout and prevents it from blowing out the upper end thereof. The cap 4 is also provided to insure an air tight arrangement of the coffee pot, and to assist in preventing the escape of water from the spout 3.

Having described the invention, I claim—

In a coffee pot, a hollow body provided with an upwardly extending spout and a cap therefor, in combination with an internally arranged conical dome having its apex cut away or apertured and provided with a circulation aperture at its lower end, a superposed strainer and coffee receptacle arranged in close proximity to said dome, and a horizontally extending branch tube connecting the spout and body and arranged in a horizontal plane approximately in line with the bottom of the strainer and coffee receptacle, whereby the boiling water and steam are projected in substantially vertical and horizontal jets against and through the strainer and coffee grounds and a thorough circulation promoted, substantially in the manner and for the purpose specified.

In testimony that I claim the foregoing as my own I have hereto affixed my signature in the presence of two witnesses.

JOHN H. BURROWS.

Witnesses:
J. W. JAMISON,
T. W. HICKS.